United States Patent [19]

Catanese

[11] Patent Number: 4,852,404

[45] Date of Patent: Aug. 1, 1989

[54] LIQUID LEVEL DETECTOR

[75] Inventor: John A. Catanese, Seward, Pa.

[73] Assignee: Westinghouse Electric Corp., Pittsburgh, Pa.

[21] Appl. No.: 73,607

[22] Filed: Jul. 15, 1987

[51] Int. Cl.⁴ .................... G01F 23/68; G01F 23/70
[52] U.S. Cl. ..................................... 73/319; 73/308; 73/314; 340/624
[58] Field of Search ................ 73/308, 314, 319, 322, 73/309; 340/624

[56] References Cited

U.S. PATENT DOCUMENTS

| | | | |
|---|---|---|---|
| 739,629 | 9/1903 | Wood | 73/314 |
| 2,911,828 | 11/1959 | Keating | 73/309 |
| 3,046,475 | 7/1962 | Binford | 73/308 |
| 3,138,024 | 6/1964 | Pariser et al. | 73/322 |
| 3,572,122 | 3/1971 | Nusbaum | 73/314 |
| 3,673,587 | 6/1972 | Baruch | 73/308 |
| 3,710,613 | 1/1973 | Innes et al. | 73/119 |
| 3,754,446 | 8/1973 | O'Connor | 73/309 |
| 3,798,595 | 3/1974 | Dyke | 340/624 |
| 3,857,004 | 12/1974 | Kavthekar et al. | 340/624 |
| 4,215,574 | 8/1980 | Godeux | 73/314 |
| 4,379,434 | 4/1983 | Thordarson | 73/308 |
| 4,387,593 | 6/1983 | Moseman | 73/290 R |
| 4,497,205 | 2/1985 | Zulauf et al. | 73/319 |
| 4,537,061 | 8/1985 | DeMever et al. | 73/308 |
| 4,647,740 | 3/1987 | Hansen, III et al. | 340/624 |

FOREIGN PATENT DOCUMENTS 1211195 11/1970 United Kingdom ................ 73/322

Primary Examiner—William A. Cuchlinski, Jr.
Assistant Examiner—Thomas B. Will

[57] ABSTRACT

Apparatus for detecting the level of a liquid. A metal-detecting proximity sensor is placed near a non-metallic, vertically-positioned guide shaft. A float is placed on the liquid. A tube has one end attached to the float and the other end insertably placed within the guide shaft. A piece of metal is placed within the tube. When the apparatus is used for determining when the level of the liquid reaches a predetermined value, the metal piece has a boundary which is located at the height of the proximity sensor only when the liquid level is at its predetermined value. When the apparatus is used for measuring the level of the liquid, the proximity sensor has an output signal proportional to the distance from itself to metal and the metal piece has an outer surface whose distance to the proximity sensor at the height of the proximity sensor, changes with changes in the liquid level.

8 Claims, 1 Drawing Sheet

LIQUID LEVEL DETECTOR

BACKGROUND OF THE INVENTION

1. Field of the Invention

The present invention relates generally to detecting the level of a liquid and, more particularly, is concerned with apparatus for determining when the level of a liquid reaches a predetermined value and apparatus for measuring the level of a liquid.

2. Description of the Prior Art

An operational step in the nuclear fuel fabrication process is the pickling operation for nuclear fuel rod cladding tubes to size and clean the zirconium tubes' inside surface before such tubes are loaded with nuclear fuel pellets. For this operation, the tubes are placed in an acid-filled tank. The nitric and hydrofluoric acid pickling solution is kept hot by submerged electric heaters. The heaters must be turned off if they are exposed to air, such as through evaporation or draining of the pickling solution. In practice, heaters have been destroyed through overheating when inadvertently left energized with the acid removed from the tank.

Commercially available liquid level detectors have been used to monitor the fluid level around the heaters. These detectors were used to shut off the heaters and/or refill the tank when a low liquid level was encountered. However, these detectors had a short life span in the harsh environment of the acid pickling solution with the detectors being repeatedly cycled on and off in the turbulent liquid encountered when a batch of tubes was placed into, or removed from, the acid. It was felt these detectors failed from the repeated cycling rather than from the acid. Such detectors included a float mechanically connected to a switch and a float having a magnet which activates a sealed magnetic reed switch.

What is needed is an economical liquid level detector which can operate in a harsh environment, one which is resistant to acid and one which can withstand repeated on-off cycling under wave action.

SUMMARY OF THE INVENTION

It is an object of the invention to provide a liquid level detector which can operate under a harsh environment involving a corrosive liquid.

It is another object of the invention to provide such an apparatus which can operate under repeated on-off cycling due to wave action.

It is a further object of the invention to provide an economical liquid level detector.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the apparatus, for detecting when the level of a liquid reaches a predetermined value, includes a non-metallic and generally vertically-positioned guide shaft, a metal-detecting proximity sensor, a float buoyantly placed on the liquid, a tube having one end attached to the float and the other end insertably placed within the guide shaft, and a piece of metal placed within the tube. The proximity sensor is placed near the guide shaft at a height for detecting metal present at that height within the guide shaft. The metal piece is placed within the tube at an elevation so that a boundary of the metal piece is positioned at the height only when the liquid level is at its predetermined value.

In an alternate embodiment of the invention, the apparatus, for measuring the level of a liquid, includes a non-metallic and generally vertically-positioned guide shaft, a metal-detecting proximity sensor, a float buoyantly placed on the liquid, a tube having one end attached to the float and the other end insertably placed within the guide shaft, and a piece of metal placed within the tube. The proximity sensor is placed near the guide shaft at a height and has an output signal proportional to the distance from itself to metal present within the guide shaft at the height. The metal piece is placed within the tube and has an outer surface whose distance to the proximity sensor, at the height of the proximity sensor, changes with changes in the liquid level.

In a preferred embodiment of the invention, whereas the metal piece is susceptible to corrosion by the liquid, the guide shaft, the float, and the tube are resistant to corrosion by the liquid with the tube attached liquid-tight to the float at its one end and with the tube sealed liquid-tight at its other end.

Several benefits and advantages are derived from the invention. The metal-detecting proximity sensor feature of the invention provides a liquid level detector which can withstand repeated on-off cycling due to wave action. The corrosion-resistant guide shaft, float, and tube feature provides a liquid level detector which can withstand a harsh acid environment.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
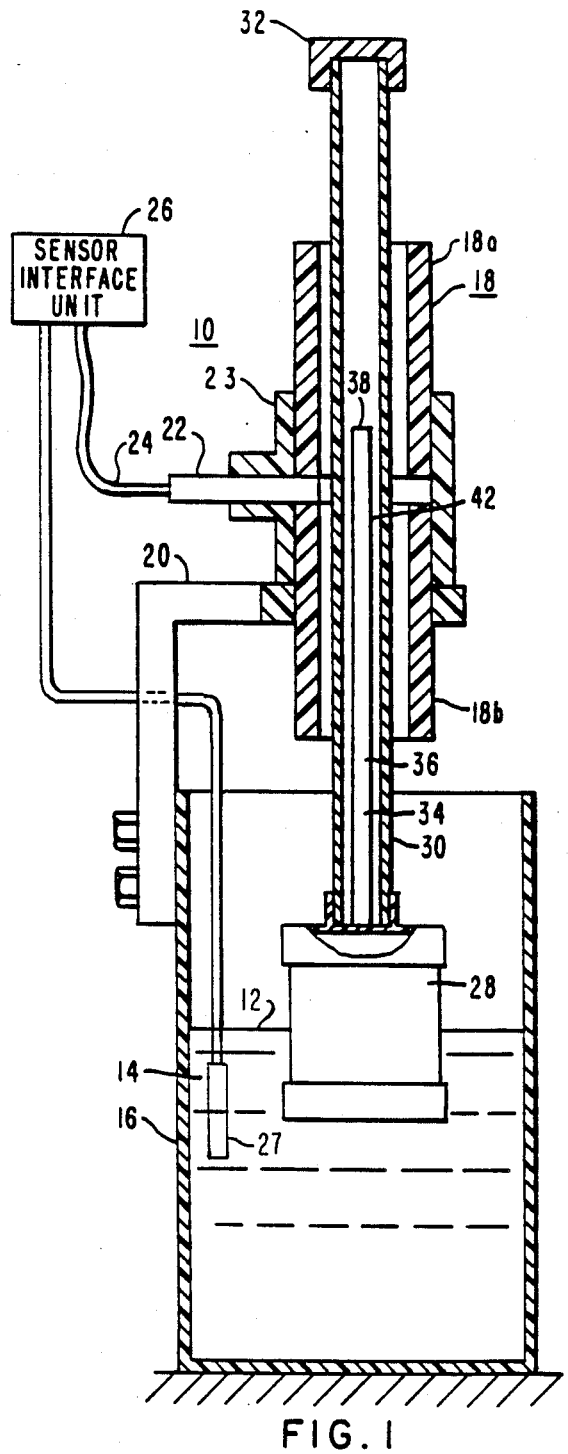
FIG. 1 is an elevational side view, partially in section, of the liquid level detector apparatus of the invention.

Reference will now be made in detail to several present preferred embodiments of the invention, some examples of which are illustrated in the accompanying drawings. In the drawings, like reference characters designate like or corresponding parts throughout the several views.

The liquid level detector apparatus 10 of the invention is shown in FIG. 1 being used to detect the level 12 of a liquid 14, contained in a tank 16. Preferably, the liquid 14 is a heated nitric and hydrofluoric acid pickling solution for nuclear fuel rod zirconium cladding tubes (with the tubes and the electric heaters omitted from FIG. 1 for clarity). In other applications, the liquid 14 can be an alkaline solution or some other acid solution. The liquid level detector 10, although designed to operate in a corrosive liquid, also can operate in water or in other non-corrosive fluids.

The liquid level detector 10 includes a non-metallic and generally vertically-disposed guide shaft 18. A clamp 20 has one end attached to the tank 16 and has its other end supporting the guide shaft 18. A preferred material for the guide shaft is polyvinyl chloride (PVC) which is resistant to corrosion by acids, such as by the previously-discussed acid pickling solution.

A metal-detecting proximity sensor 22 is positioned near the guide shaft 18 at a height along the guide shaft. Metal-detecting proximity sensors are commercially available, known to those skilled in the art, and can be obtained with a PVC casing. In a preferred arrangement, the proximity sensor 22 is attached to the guide shaft 18 with its sensing end penetrating the guide shaft and being flush with the guide shaft inner wall. For example, the proximity sensor 22 can be inserted into the side of a one-inch PVC Tee 23 into whose top and bottom openings one-inch PVC pipes 18a and 18b have been inserted to create the guide shaft 18 (see FIG. 1). A cable 24 leads from the proximity sensor 22 to the sensor interface unit 26. Electric power is channeled to the proximity sensor 22 through the cable 24 from the interface unit 26, and a metal-detected output signal is channeled from the proximity sensor 22 through the cable 24 to the interface unit 26. The output signal may be used to turn off the electric heaters (not shown), turn on a valve 27 supplying liquid to the tank, etc. Proximity sensors 22 include ring-shaped proximity sensors (not shown) which detect metal present in the plane of the ring (instead of along a centerline as with the more typical proximity sensors 22, such as shown in FIG. 1), as is known to those skilled in the art, and which can be utilized in the practice of the invention.

A float 28 is buoyantly disposed on the liquid 14. A preferred material for the float 28 is PVC, and in an exemplary embodiment, the float 28 is made from four-inch PVC pipe with top and bottom four-inch PVC caps secured thereto using, for example, PVC cement. A tube 30 has one end attached to the float 28 and has its other end insertably disposed within the guide shaft 18. A preferred material for the tube 30 is PVC, and in an exemplary embodiment, the one end of the tube 30 is attached liquid-tight to the float 28 and the other end of the tube 30 has a liquid-tight seal, such as a removable cap 32. A piece of metal 34 is placed within the tube 30. The preferred material for the metal piece 34 is steel, and the preferred shape is that of an annular rod 36. A steel rod is susceptible to corrosion by the previously-discussed acid pickling solution.

Figure 2A:
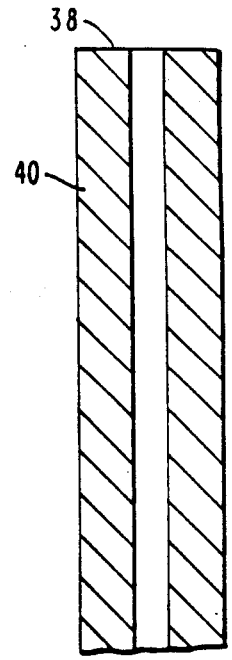
FIG. 2A is a cross-sectional view of the metal rod, used in the liquid level detector apparatus of FIG. 1, which is employed for detecting when the level of the liquid reaches a predetermined value.

When employed to determine when the level of a liquid reaches a predetermined value, the metal piece 34 is placed at an elevation along the tube 30 so that the metal piece has a boundary 38 which is located at the height of the proximity sensor 22 only when the liquid level 12 is at the predetermined value. In an exemplary embodiment, the metal piece 34 is the metal rod 36 having its lower end placed near the one end (bottom) of the tube 30 and having a length chosen so that its upper end has an upper boundary 38 which is located at the height of the proximity sensor 22 only when the liquid level 12 is at the predetermined value. The metal rod 36 should be interchangeable to accommodate different predetermined values of liquid level. An exemplary metal rod 40 is shown in FIG. 2A. The proximity sensor 22 will give an output signal when it detects metal present within the guide shaft 18 at the height of the sensor 22. In the case of the pickling operation, the proximity sensor 22 will continue to give a metal-detected output signal as the liquid level 12 falls until the rod's upper boundary 38 descends past the sensor 22. At that moment, the proximity sensor 22 would cease to give an output signal, and this change would be used to turn off the electric heaters, etc.

Other applications may employ multiple metal pieces 34 longitudinally spaced apart within the tube 30 with a single proximity sensor 22, a single metal piece 34 with multiple longitudinally spaced apart proximity sensors 22, or multiple metal pieces and multiple proximity sensors. Any such application may use the top boundary, bottom boundary, or both boundaries of each metal piece 34 to detect various predetermined values of the liquid level 12 and respond according to the particular application.

Figure 2B:
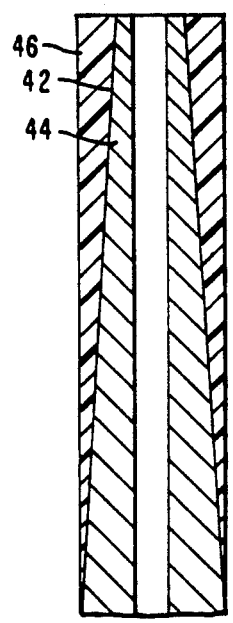
FIG. 2B is a cross-sectional view of the metal rod, used in the liquid level detector apparatus of FIG. 1, which is employed for measuring the level of the liquid.

When employed to measure the level of a liquid, the metal piece 34 has an outer surface 42 whose distance to the proximity sensor 22, at the height of the proximity sensor 22, changes with changes in the liquid level 12. In an exemplary embodiment, the metal piece 34 is the metal rod 36 having an outer cylindrical surface 42 which is linearly tapered. An exemplary metal rod 44 is shown in FIG. 2B and includes a non-metallic casing 46 to maintain a right-circular cylindrical shape to center the metal rod in the tube 30 to improve measurement accuracy. Other centering techniques are known to those skilled in the art. The proximity sensor 22 will give an output signal proportional to the distance from itself to metal present within the guide shaft 18 at the height of the sensor 22. By calibrating the output signal for a particular metal rod 44 over a range of liquid levels, as can be appreciated by the skilled artisan, the liquid level detector 10 can use its proximity sensor 22 to measure the liquid level 12. For the pickling operation, at the moment the proximity sensor 22 measures a liquid level 12 equal to a predetermined value, this event would be used to turn off the electric heaters, etc.

The above-described elements of the liquid level detector 10 work together either to determine when the level of a liquid reaches a predetermined value (by using the presence/absence of an output signal from the proximity sensor 22 and a metal rod 36 like the metal rod 40 of FIG. 2A) or to measure the level of a liquid (by using the magnitude of the output signal from the proximity sensor 22 and a metal rod 36 like the metal rod 44 of FIG. 2B). It is clear that the dimensions of the elements, such as the length of the metal rod 40 and the taper of the metal rod 44, etc. are to be chosen to best meet the demands of the particular liquid level detection application, as is within the purview of those skilled in the art.

It will be apparent that many modifications and variations are possible in light of the above teachings. It, therefore, is to be understood that within the scope of the appended claims, the invention may be practiced other than as specifically described.

I claim:

1. Apparatus for deenergizing electric heaters disposed in an acid bath when the level of the acid bath reaches a predetermined value, comprising:
   (a) a non-metallic, generally vertically-disposed guide shaft;
   (b) a metal-detecting proximity sensor disposed proximate said guide shaft at a height along said guide shaft for detecting metal present within said guide shaft at said height;

(c) a corrosion-resistant float buoyantly disposed on said acid bath;

(d) a corrosion-resistant, hermetically sealed tube with two ends, the first of said ends attached to said float and the other of said ends insertably disposed within said guide shaft;

(e) a nonpermanently magnetized corrosible metal rod sealingly enclosed within said tube and having a boundary disposed within said tube at an elevation along said tube such that said boundary is situated at said height only when said acid bath level is at said predetermined value;

(f) electric heaters disposed in said acid bath for heating said acid bath; and (g) means responsive to the output of said proximity sensor for deenergizing said heaters thereby preventing damage to said heaters when said acid bath level drops below said predetermined value.

2. The apparatus of claim 1, wherein said metal rod has a length, an upper end having said boundary, and a lower end, with said lower end disposed proximate said first end of said tube and with said length chosen such that said boundary of said upper end is situated at said height only when said acid bath level is at said predetermined value.

3. The apparatus of claim 2, wherein said metal rod comprises an interchangeable, annular metal rod and said hermetically sealed tube includes a removable cap.

4. Apparatus, for measuring the level of a liquid, comprising:

(a) a non-metallic, generally vertically-disposed guide shaft;

(b) a metal-detecting proximity sensor disposed proximate said guide shaft at a height along said guide shaft and having an output signal proportional to the radial distance from itself to metal present within said guide shaft at said height;

(c) a float buoyantly disposed on said liquid;

(d) a tube with two ends, one of said ends attached to said float and the other of said ends insertably disposed within said guide shaft; and (e) a piece of metal, disposed within said tube, having an outer surface whose radial distance to said proximity sensor, at said height of said proximity sensor, changes with changes in said liquid level.

5. The apparatus of claim 4, wherein said guide shaft, said float, and said tube each are resistant to corrosion by said liquid and said metal piece is susceptible to corrosion by said liquid, and wherein said one end of said tube is attached liquid-tight to said float and said other end of said tube has a liquid-tight seal.

6. The apparatus of claim 5, wherein said metal piece comprises a metal rod.

7. The apparatus of claim 6, wherein said metal rod has an outer cylindrical surface which is linearly tapered.

8. The apparatus of claim 7, wherein said metal rod comprises an annular metal rod.

* * * * *